A. A. ARNOLD.
Dinner-Cans.
No. 139,851. Patented June 17, 1873.
Fig. 1.
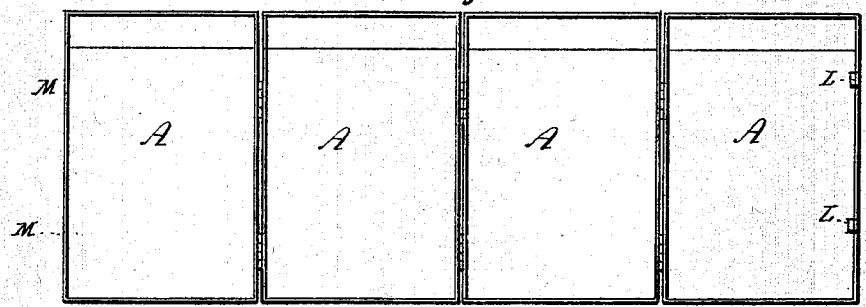
Fig. 2. Fig. 3. Fig. 4.
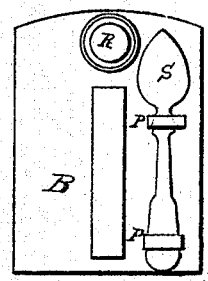 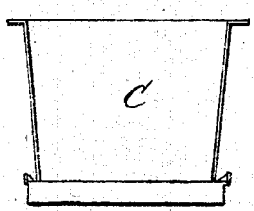 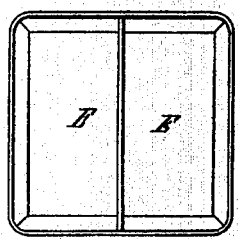
Fig. 5. Fig. 6. Fig. 7.
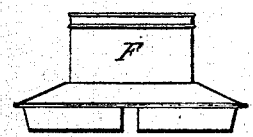 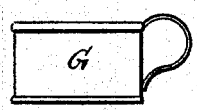 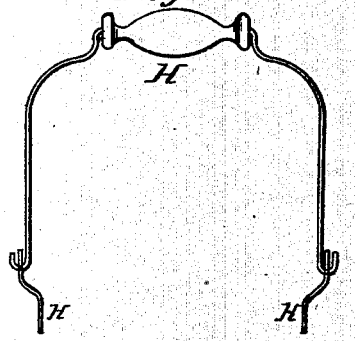
Fig. 9. Fig. 8.
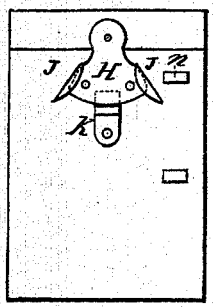 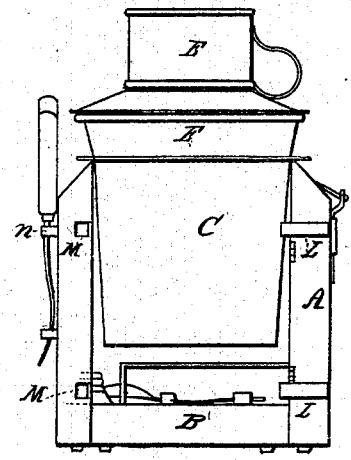
Witnesses
J. S. Rhodes
B. D. Williams
Inventor
Albert A. Arnold

UNITED STATES PATENT OFFICE.

ALBERT A. ARNOLD, OF CLYDE, OHIO.

IMPROVEMENT IN DINNER-CANS.

Specification forming part of Letters Patent No. 139,851, dated June 17, 1873; application filed March 10, 1873.

*To all whom it may concern:*

Be it known that I, ALBERT A. ARNOLD, of Clyde, in the county of Sandusky and State of Ohio, have invented certain Improvements in Dinner-Cans, of which the following is a specification:

The nature of my invention consists in a combination of a series of tin plates or dishes, attached to each other with hinges, which, when folded up, form the body of a can, into which are fitted a coffee-can, vegetable and meat can, pastry-can, sauce or butter cup, and drinking-cup, together with recesses and loops for knife, fork, and spoon.

Figure 1 in the accompanying drawings represents four tin plates or dishes, A A A A, spread out preparatory to lunch or dinner. Fig. 2 is a coffee-can, having handle, spout, and loops for a spoon. Fig. 3 is a pastry-can for bread, pie, cake, &c. Fig. 4 is a vegetable and meat can. Fig. 5 is a butter or sauce cup. Fig. 6 is a drinking-cup. Fig. 7 is a bail and ears. Fig. 8 represents the plates A folded, forming a can, in which the coffee-can B forms the bottom, next above the pastry-can C and vegetable and meat can E, to the lid of which is attached a butter or sauce cup, F, and crowned with a drinking-cup, G, inverted.

To explain the nature and construction of my can more fully, the plates A are folded so as to form three sides of the body of the can, leaving the fourth side open like a door, as shown in Fig. 8; then place the coffee-can B crosswise in forming the bottom; then close the door or fourth side of the can, which is provided with two clasps or hooks, L L, which enter slots M M in the next plate, forming a can; next, the pastry-can is placed in the top of the can, but extends down nearly to the coffee-can, permanently locking clasps or hooks L L; next, the vegetable and meat can E E is placed on the pastry-can. Said vegetable can is provided with a lid having a butter or sauce cup, F, and crowned with a drinking-cup; and last, attach the bail by slipping the ears H H under the clamps J J; then turn the button K, as shown in Fig. 9, which completes the arrangement. This pastry-can has also a drop-side for convenience of emptying and filling.

This dinner-can is designed for laboring men, mechanics, or travelers. It is intended to set the can on a hot stove or range a sufficient length of time to allow the coffee to become hot. The can is made with space between the coffee-can B and the sides A, also in the hinges of the sides A, to admit of the heat passing in under the pastry-can C, thereby warming the dinner contained in the cans C and E. After warming the dinner, turn the buttons K K from under the ears H H, allowing the ears and bail H H to drop from the can; lift the drinking-cup G from the sauce-cup F; lift cover and cup F from the vegetable-can E E; then lift the vegetable-can E from the pastry-can C; then lift the pastry-can C from the sides A, which unlocks the door so it can be opened, as is shown in Fig. 8; then take the coffee-can B from within the sides A and straighten them, and lay them down, as shown in Fig. 1, thereby making a table or plates for eating on. Drop the side D of the pastry-can C, as shown in Fig. 3, to enable you to get the pastry from the can without breaking.

I claim—

1. The plates A with hinges, constructed so as to form a can when folded, or a table when spread out, as specified.

2. The combination of the plates A and coffee-can B, pastry-can C, vegetable and meat can E E, sauce-cup F, drinking-cup G, the bail and ears H H, as and for the purpose hereinbefore described.

ALBERT A. ARNOLD.

Witnesses:
B. B. WILLIAMS,
J. H. RHODES.